United States Patent [19]
Jenkins et al.

[11] Patent Number: 5,042,757
[45] Date of Patent: Aug. 27, 1991

[54] HOSE CLAMP

[75] Inventors: Jon A. Jenkins; John P. Barry; Thomas V. Thole, Jr., all of Wooster, Ohio

[73] Assignee: Premier Industrial Corporation, Cleveland, Ohio

[21] Appl. No.: 518,981

[22] Filed: May 4, 1990

[51] Int. Cl.⁵ .............................................. F16C 55/14
[52] U.S. Cl. ................................ 248/75; 248/316.2; 248/316.4; 251/5; 251/7
[58] Field of Search ................... 248/75, 316.2, 316.3, 248/231.3, 316.4; 24/463, 134 KB, 134 R, 69 R; 251/5, 7

[56] References Cited

U.S. PATENT DOCUMENTS

| | | |
|---|---|---|
| 1,913,032 | 6/1933 | Krause .......................... 24/134 R |
| 2,245,030 | 6/1941 | Goffesfeld et al. ............... 251/7 |
| 2,890,855 | 6/1959 | Little ........................... 251/5 |
| 3,011,750 | 12/1961 | Johnson et al. ................. 251/5 |
| 3,012,701 | 12/1961 | Welsen ....................... 251/7 X |
| 3,212,671 | 10/1965 | Rock .......................... 251/7 X |
| 3,729,068 | 4/1973 | Fuller ..................... 24/134 R X |
| 4,242,903 | 1/1981 | Cedford et al. ............... 251/5 X |
| 4,467,997 | 8/1984 | Waylele, Jr. ................... 251/7 |
| 4,682,755 | 7/1987 | Bernstein et al. ............. 251/5 X |

Primary Examiner—Alvin C. Chin-Shue
Attorney, Agent, or Firm—Jones, Day, Reavis & Pogue

[57] ABSTRACT

A hose clamp having a pair of jaws between which a hose is clampable. One jaw is a rotatable cam jaw that automatically applies a greater clamping force under the influence of differential pressure in a hose on opposite sides of the jaws, and under the influence of impending sliding movement of the clamp along a hose.

20 Claims, 4 Drawing Sheets

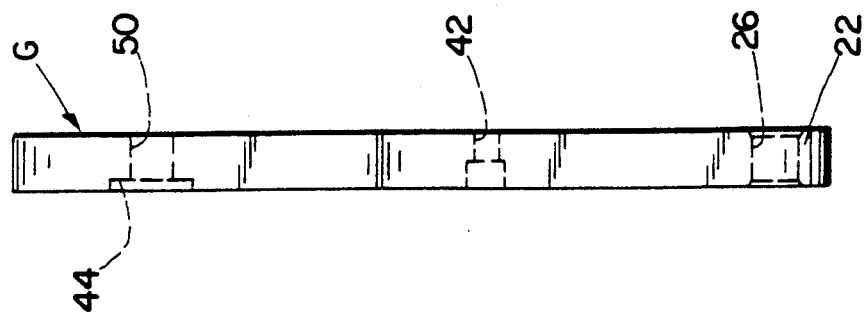
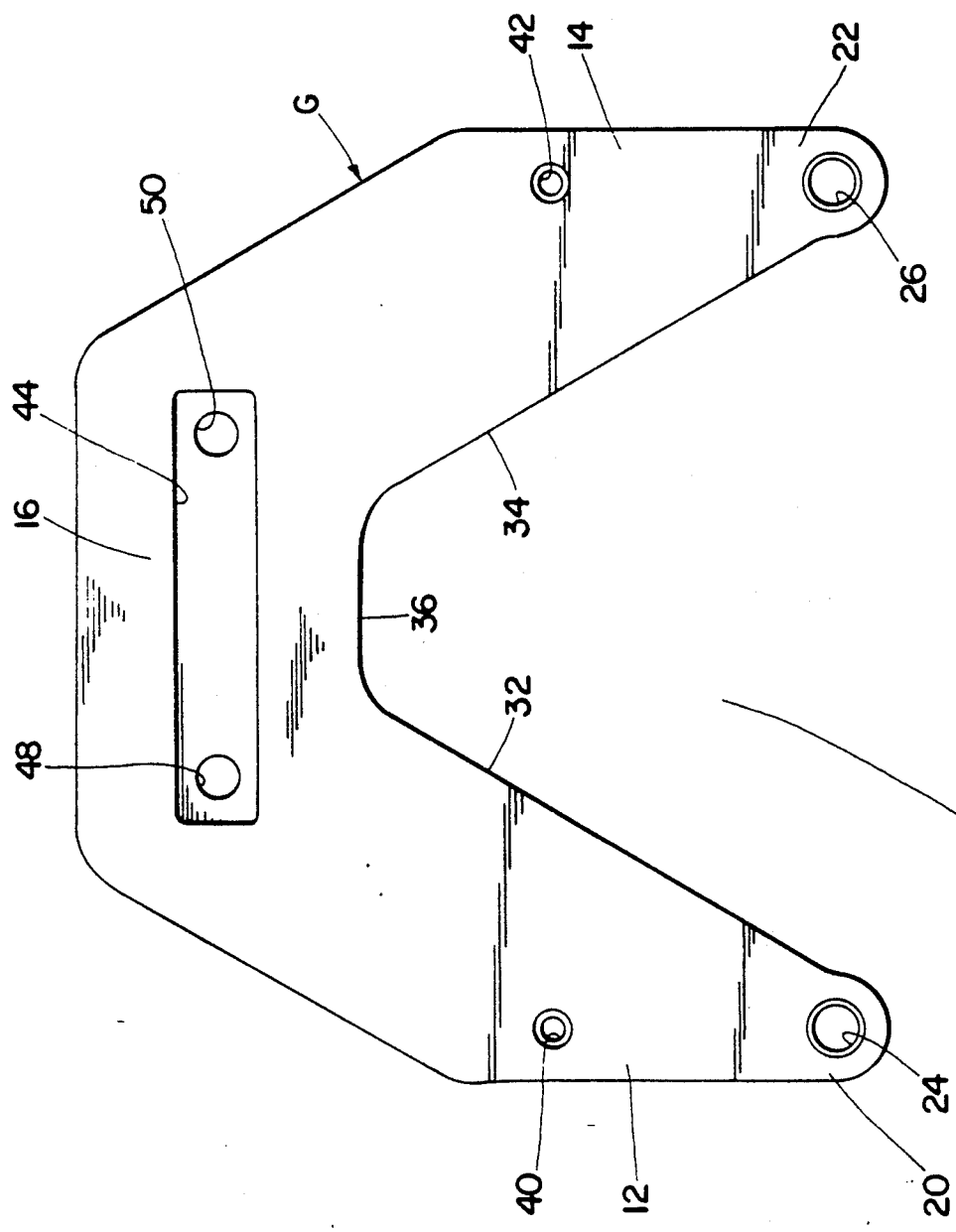

HOSE CLAMP

BACKGROUND OF THE INVENTION

This application relates to the art of hose clamps and, more particularly, to hose clamps of the type having a pair of jaws between which a hose is clamped to restrict or stop flow therethrough. The invention is particularly applicable to a portable hose clamp and will be described with particular reference thereto. However, it will be appreciated that certain features of the invention have broader aspects, and can be used as part of a permanent installation in fluid flow control systems.

Hose clamps of the type having a pair of jaws between which a flexible hose is compressively squeezed tend to slide along the hose in a direction from the high pressure side to the low pressure side thereof. It would be desirable to have an arrangement for automatically counteracting this sliding tendency without requiring additional manual operation of the clamp.

SUMMARY OF THE INVENTION

A hose clamp of the type described includes a cam jaw that is rotatable about an axis for automatically applying a greater clamping force to a flexible hose responsive to differential pressure in the hose on opposite sides of the clamp jaws, and responsive to the tendency of the clamp to slide along the hose.

The rotatable cam jaw is preferably biased to a rest position providing the maximum spacing of its cam surface from the opposite jaw. In a preferred arrangement, the biasing means is provided by locating the center of gravity of the rotatable cam jaw below its rotational axis. Rotation of the cam jaw from its rest position to variable operated positions moves the cam surface of the cam jaw closer to the opposite jaw.

The rotatable cam jaw is preferably symmetrical about opposite sides of a vertical plane that bisects the same and passes through its rotational axis.

The support frame for the hose clamp includes a pair of spaced-apart identical flat plates having a generally U-shaped configuration. A movable jaw is mounted between the plates and slideably guided thereby.

The rotatable cam jaw is mounted on a base that is attached to two terminal end portions of spaced-apart legs on the U-shaped plates. A hose receiving space is defined between the plate legs and the cam jaw. The opposite sides of the hose receiving space converge from the terminal end portions of the plate legs toward the movable jaw that is opposite from the rotatable cam jaw.

A hydraulic cylinder is mounted between the pair of frame plates for selectively moving the movable jaw toward and away from the rotatable cam jaw.

A hydraulic pump remote from the hydraulic cylinder is connected to such cylinder by an elongated flexible hose. When the clamp is applied to a hose and the water is turned on, the hose and clamp may move suddenly and violently due to elastic stretching of the hose. Remote location of the pump and connection of same with a cylinder by an elongated flexible hose minimizes the possibility of injury to a person holding or operating the pump when the hose and clamp make a sudden violent movement. The movement of the clamp is due to hose stretching, and should not be confused with sliding movement of the clamp along the hose, because such sliding movement is substantially eliminated by the cam jaw.

It is a principal object of the present invention to provide an improved hose clamp for squeezably clamping a flexible hose.

It is another object of the invention to provide an improved hose clamp having an improved cam jaw.

It is also an object of the invention to provide a hose clamp having means for automatically applying a greater clamping force responsive to differential pressure in a hose on opposite sides of clamping jaws.

It is an additional object of the invention to provide a hose clamp having a rotatable cam jaw that automatically applies a greater clamping force on a hose on impending sliding movement of the clamp along the hose.

It is also an object of the invention to provide a hose clamp having improved and simplified support frame means for supporting clamping jaws and a hydraulic cylinder.

BRIEF DESCRIPTION OF THE DRAWING

FIG. 3 is a side elevational view of a frame plate showing the inside surface thereof;

FIG. 4 is a side elevational view of the plate of FIG. 3;

DESCRIPTION OF A PREFERRED EMBODIMENT

Figure 2:
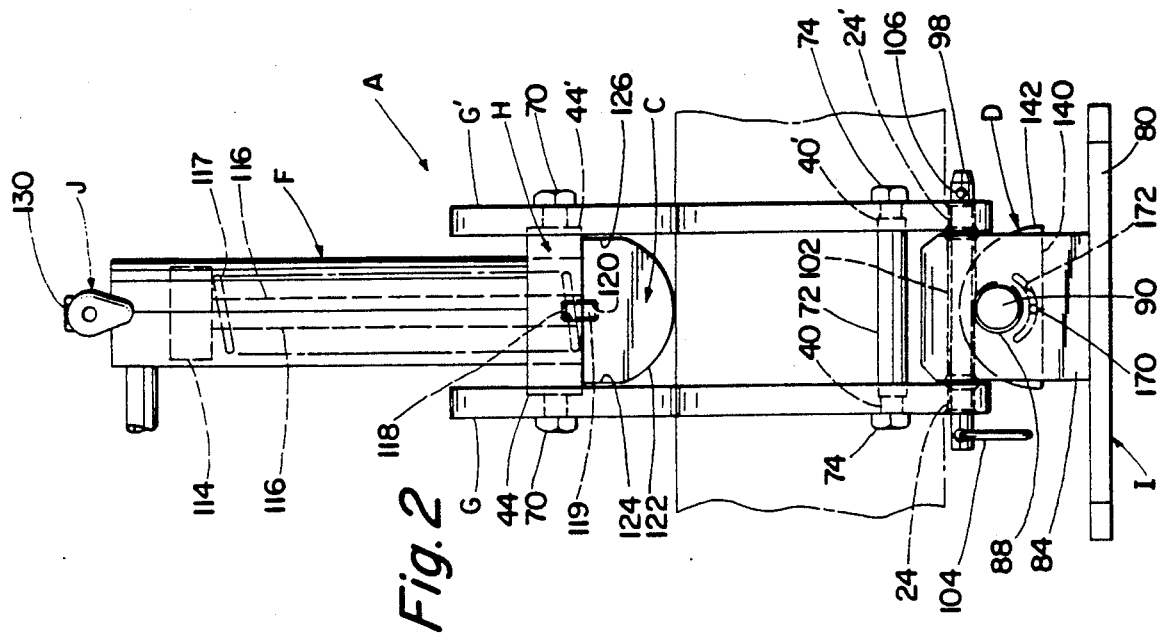
FIG. 2 is a side elevational view of the hose clamp of FIG. 1.
Figure 1:
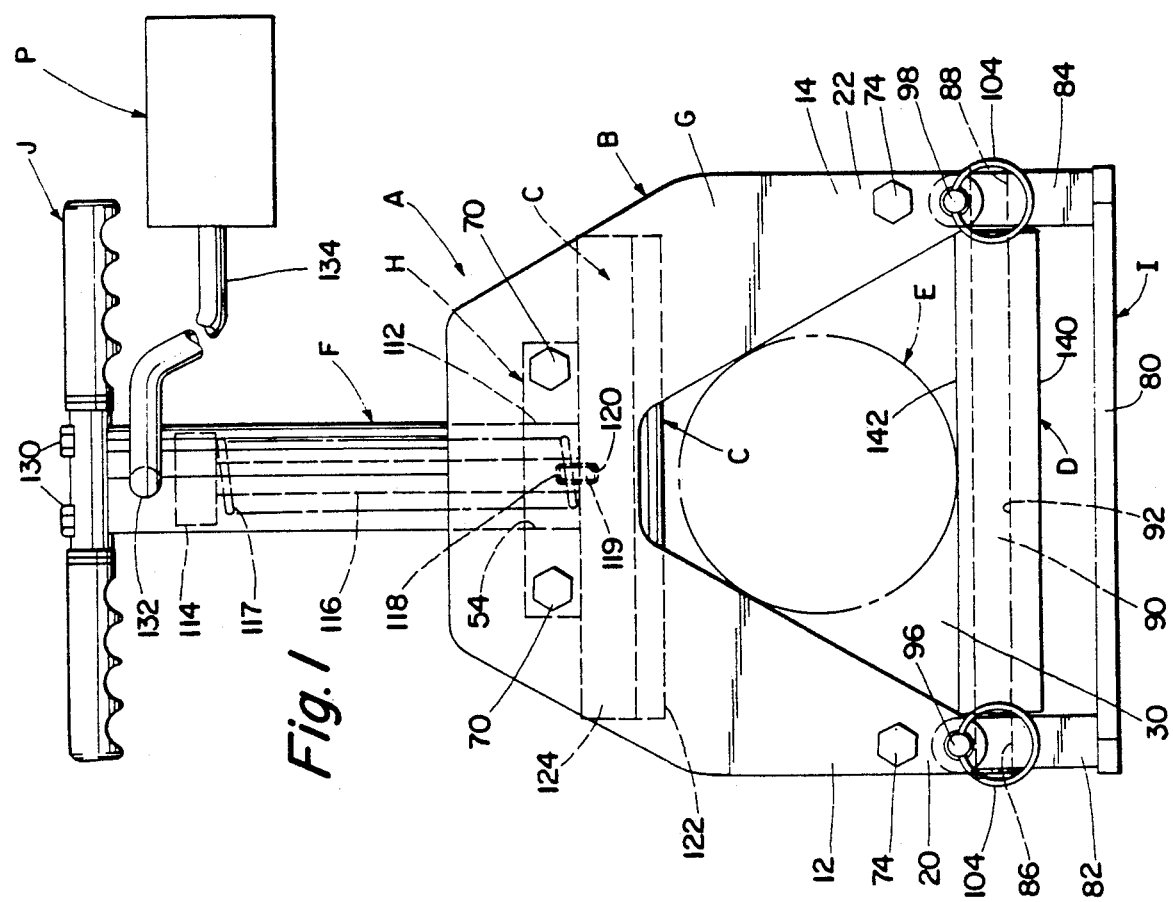
FIG. 1 is a front elevational view of a hose clamp constructed in accordance with the present application.

Referring now to the drawings, wherein the showings are for purposes of illustrating a preferred embodiment of the invention only and not for purposes of limiting same, FIGS. 1 and 2 show an improved hose clamp A constructed in accordance with the present application.

Clamp A includes support frame means B for supporting a pair of jaws C, D between which a hose E is selectively clampable. A hydraulic cylinder F is mounted on support frame means B, and is connected with jaw C for moving same toward and away from jaw D. Movable jaw C is preferably moved to a position for completely blocking flow through hose E. Intermediate positions of the jaws in which flow through hose E is only partly restricted are undesirable.

Support frame means B includes a pair of spaced-apart parallel flat plates G, G' of identical construction. As shown in FIGS. 3 and 4, plate G is generally U-shaped or horseshoe shaped, and has a pair of spaced-apart legs 12, 14 connected at one end thereof by connecting portion 16. Legs 14 have free terminal end portions 20, 22 with holes 24, 26 therethrough.

A hose receiving space generally indicated at 30 in FIG. 3 is defined between legs 12, 14 and connecting portion 16. Hose receiving space 30 has opposite sides 32, 34 that converge from leg terminal end portions 20, 22 toward connecting portion 16, and intersect a straight portion 36 along connecting portion 16.

Countersunk holes 40, 42 are provided in legs 12, 14 for receiving pins and bolts that secure plates G, G' together in spaced-apart parallel relationship. A rectangular recess 44 in connecting portion 16 is adapted to receive opposite sides of a hydraulic cylinder mounting block. A pair of spaced-apart bolt receiving holes 48, 50 extend through plate G in alignment with recess 44.

Figure 6:
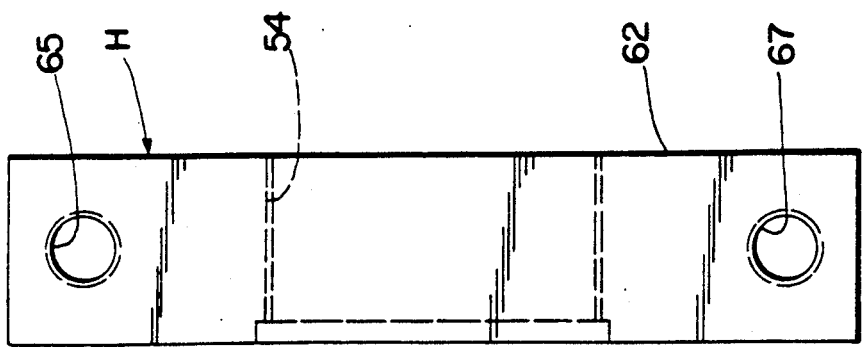
FIG. 6 is a side elevational view of the mounting block of FIG. 5.
Figure 5:
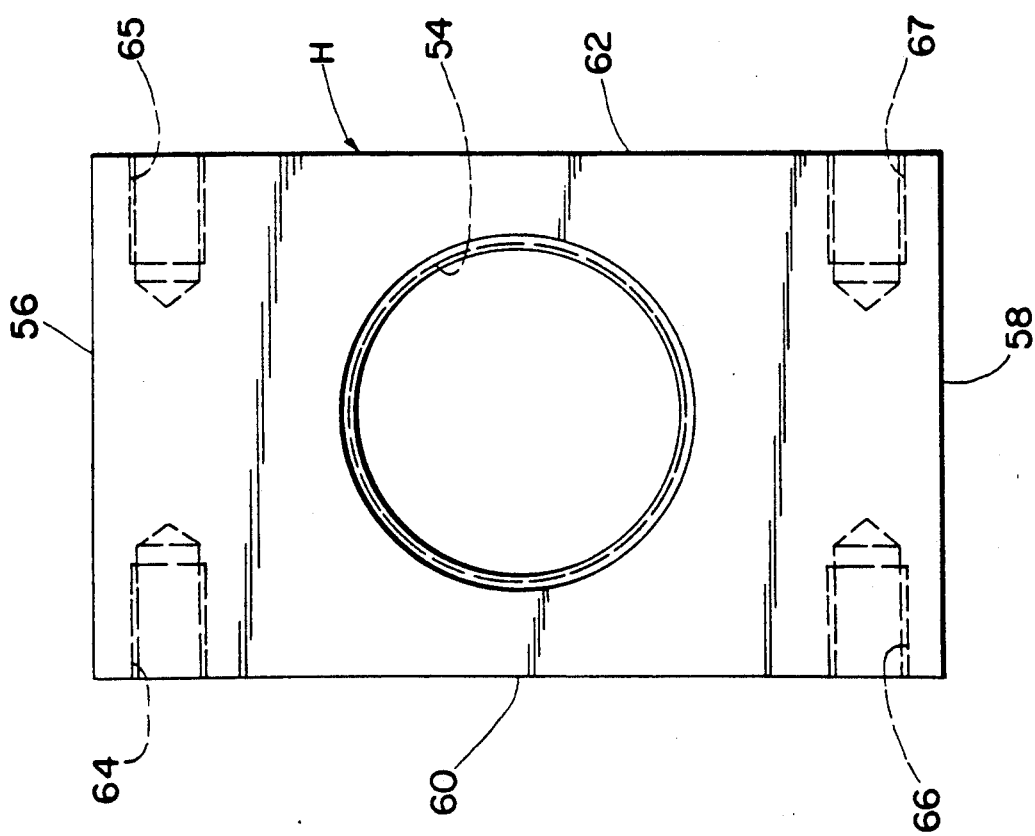
FIG. 5 is a top plan view of a hydraulic cylinder mounting block.

FIGS. 5 and 6 show a rectangular hydraulic cylinder mounting block H having a central threaded hole 54 therethrough for receiving an externally threaded end portion on cylinder F of FIGS. 1 and 2. Hydraulic cylinder mounting block H has rectangular opposite ends 56, 58 and rectangular opposite sides 60, 62. Opposite sides 60, 62 are dimensioned and shaped for very close reception in recess 44 in plate G of FIGS. 3 and 4. Threaded bolt receiving holes 64, 67 extend into sides 60, 62 of mounting block H.

To assemble the frame, a pair of plates G, G' are positioned in spaced-apart relationship with opposite sides 60, 62 of a hydraulic cylinder mounting block H received in recesses 44, 44' thereof. A plurality of bolts 70 are then extended through the holes 48, 50 in the plates and into holes 64×67 in mounting block H. A pair of cylindrical pins, only one of which is shown at 72 in FIG. 2, have the opposite end portions thereof received in the countersunk portions of holes 40, 40' in plates G, G'. The pins 72 have threaded holes in their opposite ends for receiving bolts 74. Thus, bolts 70,74 cooperate with plates G, G', and with mounting block H and pins 72, to secure plates G, G' together in spaced-apart parallel relationship.

A frame base I has a flat base plate 80 adapted to be supported on a horizontal supporting surface. A pair of spaced-apart upright supports 82, 84 extend upwardly from base plate 80, and have holes 86, 88 therethrough receiving opposite end portions of a pin 90, closely received through a longitudinal cylindrical hole 92 in jaw D. The opposite end portions of pin 90 preferably extend outwardly of upright supports 82, 84 and have circumferential grooves therein for receiving C-rings.

Upright supports 82, 84 have additional holes therein spaced above holes 86, 88 perpendicular thereto for receiving retaining pins 96, 98. Only one such pin receiving hole is shown at 102 in FIG. 2 for upright support 84. As shown in FIG. 2, pin 98 also extends through holes 24, 24' in plates G, G'. Split rings 104 extend through suitable holes in one end portion of pins 96,98 to facilitate insertion and removal of the pins. The rings also provide stops to limit insertion of the pins. The opposite end portions of pins 96, 98 have spring loaded ball detents 106 that allow insertion and removal of the pins while preventing accidental displacement thereof from their installed positions. Removal of one pin 96 or 98 allows pivotal movement of support frame means B about the other pin to open space 30 for insertion and removal of a hose E.

Cylinder F has an externally threaded bottom end portion 112 threaded into hole 54 in cylinder mounting block H. Cylinder F includes an internal piston 114 having a rod 116 attached thereto. A coil spring 117 within cylinder F around rod 116 acts against piston 114 for moving same in a direction to move jaw C to its fully open position when the hydraulic pump relief valve is opened.

The free end portion of rod 116 opposite from piston 114 has an internally threaded socket 118 that is threaded into one end portion of an externally threaded stub 119 whose opposite end is threaded into a tapped centrally located hole 120 in the flat upper surface of jaw C. The opposite surface of jaw C is smoothly curved transversely as indicated at 122 in FIG. 2. Curved surface 122 is preferably located on the periphery of a circle so that jaw C is symmetrical on opposite sides of a bisecting plane extending through the center of cylinder rod 116.

Upper jaw C has two opposite flat areas 124, 126 to provide bearing surfaces for the jaw as it slides between side supports G, G' when under load. A handle J is suitably secured to the upper end of cylinder F as by bolts 130.

A manually operable hydraulic pump P is connected as at 132 with cylinder F by an elongated flexible hose 134. Hose 134 is preferably at least several feet long so that pump P can be positioned remote from hose clamp A on the same supporting surface as hose clamp A. Pump P includes a selectively operable pump handle and valve in a known manner for supplying hydraulic fluid to cylinder F above piston 114 to selectively move jaw C toward jaw D. Selective operation of the valve relieves the hydraulic pressure within cylinder F above piston 114 so that hydraulic fluid can drain back to the reservoir associated with pump P.

As shown in FIG. 2, cam jaw D is generally D-shaped in a side view so that it has a substantially flat bottom 140 and a smoothly curved upper cam surface 142. Cam surface 142 is preferably curved on the periphery of a circle. Rotatable cam jaw D is symmetrical on opposite sides of a vertical plane bisecting cam jaw D and passing through the longitudinal axis of pin 90. Thus, hose clamp A is bidirectional and can be applied to a hose with either plate G or G' facing the high pressure side.

The rotational axis of cam jaw D defined by the longitudinal axis of pin 90 is located substantially closer to upper curved surface 142 thereof than to flat bottom surface 142 thereof. Thus, curved surface 142 is eccentric relative to the rotational axis. In addition, the center of gravity of cam jaw D is located directly below the axis of pin 90 so that cam jaw D is normally biased to a rest position shown in FIGS. 1 and 2. In the rest position, cam surface 142 has maximum spacing from upper movable jaw C. When cam jaw D is rotated in either direction about the axis of pin 90, curved cam surface 142 will move to variable operative positions located closer to jaw C than in the rest position of cam jaw D. Locating the center of gravity of cam jaw D below the rotational axis thereof provides an automatic biasing means for normally biasing cam jaw D to i's rest position in which the spacing between surfaces 122, 142 on jaws C, D is a maximum. Upper movable jaw C has flat opposite sides closely guided between plates G, G' during movement thereof toward and away from rotatable cam jaw D. Also, curved surfaces 122, 142 on jaws C, D preferably have the same curvature.

Figure 7:
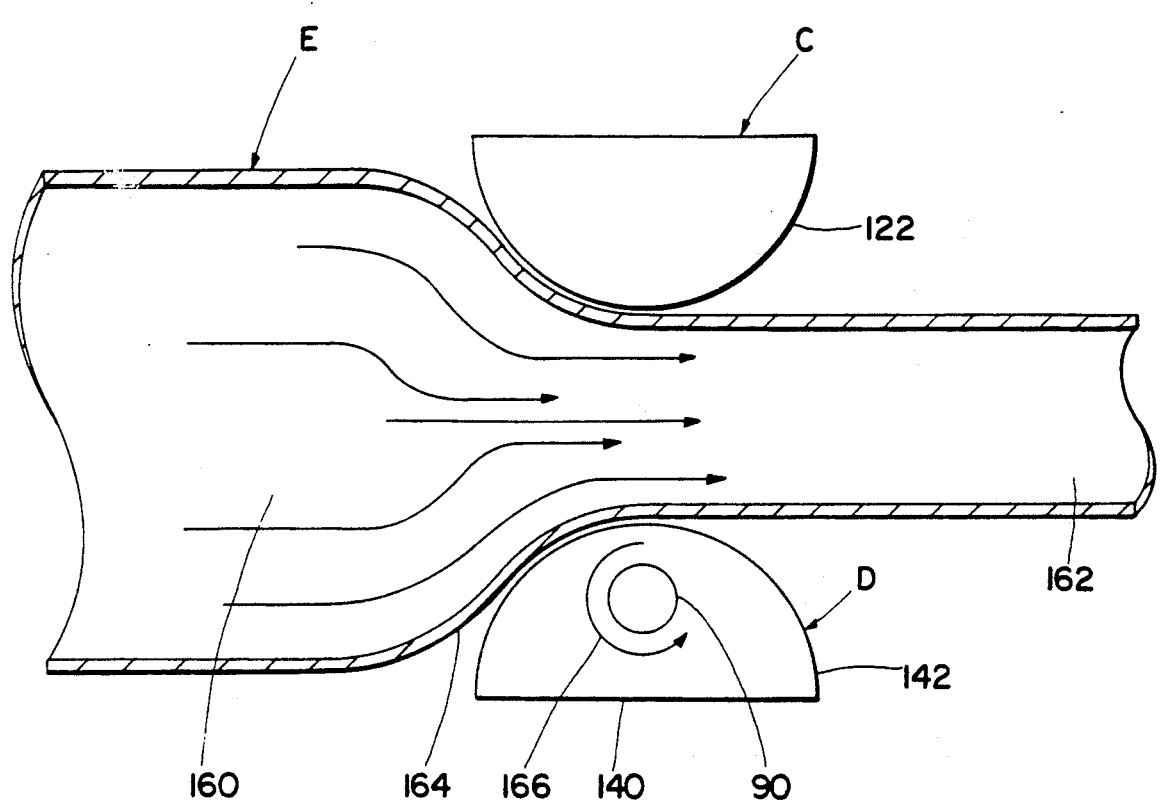
FIG. 7 is a schematic elevational view showing a hose positioned between a pair of clamping jaws.

FIG. 7 shows hose E positioned between jaws C, D, and with movable upper jaw C moved closer to bottom rotatable cam jaw D for restricting flow through hose E which now has a high pressure side 160 and a low pressure side 162. The bulge 164 in hose E on high pressure side 160 engages cam surface 142 of rotatable cam jaw D below the axis of pin 90 and tends to rotate same counter-clockwise as indicated by arrow 166. This pressure differential on opposite sides of the jaws is believed to have the dominant effect on rotation of jaw D to apply greater clamping force on hose E. However, it is possible that impending sliding movement of the hose clamp along the hose may play a part in rotation of jaw D into tighter clamping engagement with hose E. Rotation of cam jaw D moves outer cam surface 142 thereon closer to upper jaw C for applying a greater clamping force on hose E. This arrangement automatically increases the clamping force on the hose responsive to differential pressure between the high and low pressure sides of the hose on opposite sides of the jaws, due to the hose bulge 164.

FIG. 2 shows a stop pin 170 that is press fit or otherwise secured in a suitable hole in upright support 84 and projecting therefrom toward an end of rotatable cam jaw D. The free end portion of pin 170 is received in an arcuate slot 172 machined in the flat end of jaw D. The location of the pin and slot are such as to limit rotation of jaw D not more than about 60° in either direction from its normal rest position shown in FIG. 2. Obviously, the pin and slot may be arranged to provided any desired degree of rotation. The location is such that jaw D can rotate at least about 30° but not more than about 60°. Upright support 86 and the opposite flat end of jaw D may also have a stop pin and slot corresponding to stop pin 170 and slot 172.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

We claim:

1. A hose clamp having a pair of jaws between which a hose is clampable, said pair of jaws including at least one selectively movable jaw that is movable toward and away from the other of said pair of jaws for selectively clamping and releasing a hose positioned beteween said pair of jaws, at least one of said pair of jaws comprising a cam jaw rotatable about an axis and having an outer cam surface that is eccentric relative to said axis and being engageable by a hose positioned between said pair of jaws, said cam jaw having a rest position in which said cam surface faces symmetrically toward and has maximum spacing from the other of said pair of jaws, said cam jaw being rotatable about said axis in either of opposite directions from said rest position to variable operating positions in which one portion of said cam surface is located closer to said other of said pair of jaws than in said rest position of said cam jaw while the remaining portion of said cam surface is located further from said other of said pair of jaws than in said rest position of said cam jaw.

2. The hose clamp of claim 1 wherein said cam jaw is symmetrical about opposite sides of a bisecting plane passing through said axis in said rest position of said cam jaw.

3. The hose clamp of claim 1 wherein said cam surface on said cam jaw faces upwardly when said clamp is positioned on an upwardly facing substantially horizontal supporting surface and said cam jaw has a center of gravity located below said axis.

4. The hose clamp of claim 1 wherein said cam jaw has a generally D-shaped cross-sectional configuration.

5. The hose clamp of claim 1 wherein said cam jaw comprises a bottom jaw and said movable jaw comprises a linearly movable top jaw having a curved surface facing toward said cam jaw.

6. The hose clamp of claim 1 including support frame means for supporting said jaws, and said support frame means including means for selectively providing lateral access to said jaws for allowing lateral movement of a hose between or out from between said jaws.

7. The hose clamp of claim 1 including support frame means for supporting said jaws, said support frame means including a pair of spaced-apart support plates, a movable jaw support block positioned between said plates, said movable jaw being mounted on said support block between said plates.

8. The hose clamp of claim 7 wherein said plates include spaced-apart facing inner surfaces having recesses therein and said movable jaw support block has opposite ends closely received in said recesses.

9. The hose clamp of claim 7 wherein said support frame means includes a base attached to said plates, said base including a pair of spaced-apart upright supports, an elongated pin mounted on and spanning said upright supports, said cam jaw being mounted on said pin between said upright supports.

10. The hose clamp of claim 9 wherein said base is attached to said plates by separable attaching means for selectively providing separation of said base and plates to position a hose between said pair of jaws.

11. The hose clamp of claim 9 wherein said plates are generally U-shaped and include spaced-apart legs having terminal end portions attached to said base, said legs having a hose-receiving space there between.

12. The hose clamp of claim 11 wherein said hose-receiving space has opposite sides that converge from said terminal end portions of said legs.

13. The hose clamp of claim 1 wherein said cam surface lies on the periphery of a circle.

14. The hose clamp of claim 1 including support frame means for supporting said pair of jaws, said support frame means including a pair of spaced-apart support plates and a base attached to said plates, said plates having upper end portions, a hydraulic cylinder mounted between said upper end portions and extending outwardly from said plates, said movable jaw being carried by said cylinder.

15. The hose clamp of claim 14 wherein said movable jaw is closely guidably received between said plates for guiding movement of said movable jaw between hose clamping and releasing positions.

16. A hose clamp having top and bottom jaws between which a hose is clampable, said top jaw being movable toward and away from said bottom jaw, said bottom jaw being freely rotatable about an axis and having an upper cam surface facing generally toward said movable jaw and being eccentric about said axis, said bottom jaw having a rest position in which said cam surface faces toward and has maximum spacing from said movable jaw, said bottom jaw being rotatable in either of opposite directions from said rest position to variable operated positions in which one portion of said cam surface is located closer to said movable jaw than in said rest position, of said bottom jaw while the remaining portion of said cam surface is located further from said movable jaw than in said rest position of said bottom jaw, and biasing means for normally biasing said bottom jaw to said rest position.

17. The hose clamp of claim 16 wherein said bottom jaw has a center of gravity below said axis and said biasing means comprises the weight of said bottom jaw acting through said center of gravity.

18. The hose clamp of claim 16 including support frame means for supporting said top and bottom jaws, said support frame means including a pair of spaced-apart plates between which said movable jaw is slideably guided.

19. A hose clamp comprising a support frame including a pair of substantially identical individual flat plates, means for securing said plates together in substantially parallel spaced-apart relationship, each of said pair of plates having a pair of spaced-apart legs and a connecting portion extending between said legs, each said plate having a hose receiving spaced bounded by said legs and connecting portion, said legs having terminal end portions and said hose receiving spaced having opposite sides converging on one another toward said connecting portion from said terminal end portions, said support frame including a base having a pair of spaced-apart upright supports attached to said terminal end portions of said legs, an elongated pin mounted on and spanning said upright supports, said pin having a longitudinal pin axis, an eccentric clamping jaw mounted on said pin between said upright supports and being rotatable about said longitudinal pin axis, and a movable clamping jaw mounted on and slidably guided between said plates for movement toward and away from said eccentric clamping jaw.

20. The hose clamp of claim 19 wherein said support frame includes means for selectively providing lateral movement of a hose into and out of said hose receiving space.

* * * * *